(12) United States Patent
Risbjerg Jarlkov et al.

(10) Patent No.: US 10,821,411 B2
(45) Date of Patent: Nov. 3, 2020

(54) PARTICLE SEPARATING CATALYTIC CHEMICAL REACTOR WITH FILTER UNIT

(71) Applicant: Haldor Topsøe A/S, Kgs. Lyngby (DK)

(72) Inventors: Klaus Risbjerg Jarlkov, Køge (DK); Emir Zahirovic, Copenhagen (DK)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 16/611,780

(22) PCT Filed: Jul. 3, 2018

(86) PCT No.: PCT/EP2018/067964
§ 371 (c)(1),
(2) Date: Nov. 7, 2019

(87) PCT Pub. No.: WO2019/011724
PCT Pub. Date: Jan. 17, 2019

(65) Prior Publication Data
US 2020/0094210 A1  Mar. 26, 2020

(30) Foreign Application Priority Data
Jul. 14, 2017  (EP) .................................... 17181405

(51) Int. Cl.
*B01J 8/00* (2006.01)
*B01J 8/02* (2006.01)
(Continued)

(52) U.S. Cl.
CPC ........ *B01J 8/0285* (2013.01); *B01D 46/0005* (2013.01); *B01D 46/0013* (2013.01);
(Continued)

(58) Field of Classification Search
CPC ................ B01D 46/00; B01D 46/0002; B01D 46/0005; B01D 46/0013; B01D 46/0019; B01D 46/0023; B01D 46/10; B01D 46/12; B01D 46/30; B01D 46/42; B01D 46/4227; B01J 8/00; B01J 8/005; B01J 8/006; B01J 8/02; B01J 8/0285; B01J 8/0292; B01J 19/00; B01J 19/24; B01J 19/30; B01J 19/305; B01J 19/32; B01J 19/325; B01J 2208/00; B01J 2208/00796; B01J 2208/00884; B01J 2208/00946; B01J 2219/00; B01J 2219/24; B01J 2219/2401; B01J 2219/2402; B01J 2219/2423;
(Continued)

(56) References Cited

U.S. PATENT DOCUMENTS 3,186,149 A  6/1965 Ayers
3,958,952 A  5/1976 van Ginneken
(Continued)

FOREIGN PATENT DOCUMENTS

CN  202 460 593 U  10/2012
CN  102 120 118 B  12/2014
(Continued)

*Primary Examiner* — Natasha E Young
(74) *Attorney, Agent, or Firm* — Blank Rome LLP (57) ABSTRACT

A catalytic reactor comprises a filter unit which extracts and collects particles from the fluid flow stream above the reactor internals, the filter unit comprises elements which are safely, easily and quickly handled without the need for tools.

17 Claims, 5 Drawing Sheets

(51) Int. Cl.
  *B01D 46/00* (2006.01)
  *B01D 46/12* (2006.01)
  *B01D 46/42* (2006.01)
  *C10G 45/00* (2006.01)
  *C10G 47/00* (2006.01)

(52) U.S. Cl.
  CPC ......... *B01D 46/0023* (2013.01); *B01D 46/12* (2013.01); *B01D 46/4227* (2013.01); *B01J 8/0292* (2013.01); *C10G 45/00* (2013.01); *C10G 47/00* (2013.01); *B01J 2208/00884* (2013.01); *B01J 2208/00946* (2013.01); *C10G 2300/4087* (2013.01); *C10G 2300/4093* (2013.01)

(58) Field of Classification Search
  CPC .... C10G 45/00; C10G 47/00; C10G 2300/00; C10G 2300/40; C10G 2300/4087; C10G 2300/4093
  See application file for complete search history.

(56) References Cited

U.S. PATENT DOCUMENTS

| | | |
|---|---|---|
| 2009/0177023 A1 | 7/2009 | Koudil et al. |
| 2013/0236938 A1* | 9/2013 | Vander Hoff ........ B01D 63/084 435/134 |
| 2014/0034565 A1 | 2/2014 | Loken et al. |

FOREIGN PATENT DOCUMENTS

| | | |
|---|---|---|
| EP | 0 358 923 A1 | 3/1990 |
| WO | WO 2015/124527 A1 | 8/2015 |
| WO | WO 2016/110394 A1 | 7/2016 |
| WO | WO 2017/083341 A1 | 5/2017 |

\* cited by examiner

PARTICLE SEPARATING CATALYTIC CHEMICAL REACTOR WITH FILTER UNIT

This application is a national stage application claiming priority to PCT/GB2018/067964, published as WO 2019/011724, filed on Jul. 3, 2018, which claims priority to European Patent Application No. EP 17181405.6, filed on Jul. 14, 2017.

FIELD OF THE INVENTION

This invention relates to a catalytic chemical reactor with particle separation. More specifically the invention relates to a reactor with one or more filter units, filtering particles from the inlet fluid stream to the reactor before the fluid stream enters the reaction chamber with catalysts. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC). Alternatively, the reactor is a radial converter, where elements of the decks have to be fixed to the reactor. This reactor has a radial flow crossing a packed bed of catalytic material and it is typically used in the petroleum and chemical processing industries for carrying out catalytic reactions such catalytic reforming and ammonia synthesis.

BACKGROUND OF THE INVENTION

Particle separation and classification are well explored need of the chemical, pharmaceutical, mineral and food industries. While particle classification in industrial processes may be required to improve the quality of a certain product, particle separation may also be necessary to purify a fluid stream or to avoid problems to process equipment.

Sometimes particles are intentionally present in the process stream. This is for example the case of combustion processes based on pulverised fuels or production of pharmaceutical or specialty chemicals using powder technology. In other cases, the presence of particles is unintentional. This is for example the case of some refinery streams, effluents from fluidized beds, product streams from Fischer Tropsch reactors. Particles may have various origins: they may be part of the original feedstock and other reactant streams or they may be generated in and collected from process equipment, for example as erosion products. Particles may be solid or liquid, may have organic nature, like char, coke and gums, or inorganic nature, like salts, debris or corrosion and erosion as iron components, or debris of catalyst particles. They may be liquid, as some aqueous mists, and containing living impurities as bacteria. Shape and size may also vary greatly—from sphere to flakes, from millimetres to a few microns or less. If the particles are unwanted in the downstream process, often, a filter, or other suitable particle separation technology known in the art, removes large part of these particles prior to sensitive equipment.

One specific example of problems generated by particles may be seen in naphtha hydrotreating. The feed to a hydrotreating reactor is sometimes laden with particles. When the particle laden feed is introduced into the hydrotreating reactor, the particles tend to scale rapidly on the grading or the catalyst.

Reactors may thus require frequent skimming of the affected layers of the bed to contain the pressure drop build-up in the reactor. A frequency of once every 5-6 months or even of once every 2-3 months for skimming is not uncommon.

US2009177023 discloses a filtration tray for a fixed bed reactor with a co-current down-flow of gas and liquid.

The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

When installing filter units in a catalytic reactor a problem arises when the filter unit has to be serviced, for instance during installation or when collected particles have to be removed. The space for service is narrow, and hazardous, which means that known filter units are difficult and time consuming to service.

It is also a problem if the filter united clogs to fast, which entails a rise in pressure drop over the filter unit. When this pressure drop becomes too high, it impacts production efficiency negative and service/cleaning of the filter unit is necessary. The resulting production stop of the reactor is very expensive.

Therefore, a need exists for an catalytic reactor with an improved filter unit which protects the catalyst against particles in the reactor inlet reaction fluid stream, which is easy, safe and fast to service and which provides a prolonged, effective operation time of the reactor in spite of build-up of particles at the filter unit.

SUMMARY OF THE INVENTION

These problems are solved by the present invention, a catalytic chemical reactor comprising at least one filter unit. According to the invention, a catalytic reactor is provided which comprises at least one filter unit 01 to separate particles from the inlet process fluid stream flowing into the reactor before they reach the catalyst in the reaction chamber of the reactor, by collecting them at the filter unit. The filter unit comprises a base 02 and at least one filter cassette 03/04. The base has at least one mounting face 15 with dimensions, surface and fixture adapted to fit and hold the at least one filter cassette. This enables the filter cassette to be releasable mounted on the base. Hence, when servicing the filter unit, it is possible to disassemble it and handle the single lighter pieces, especially the filter cassette more easily, i.e. without lifting and handling the total weight of the filter unit. The filter cassette is adapted to collect and prevent particles above a certain size to enter the catalyst reaction chamber of the reactor. The cassette comprises a cassette frame 06 and at least one filter screen 05 with apertures. The cassette frame is adapted to hold the filter screen either releasable or fixed with fixing means as known in the art. The size of the apertures determines the size of the particles which are collected at the filter unit and which sizes are allowed to pass through the screen. To some extent, even a part of the particles with smaller size than the apertures are collected, since during operation, the larger particles collected on the screen also act as a filter, as known in the art. An essential feature of the filter unit is that the base is an integrated cassette base and filter unit outlet 08. This means that not only does the base serve the purpose of mounting the one or more filter cassettes with one or more filter screens, it also serves as outlet for the filter unit to the reactors catalytic reaction chamber downstream the filter unit, which is a feature that further reduces the size and complexity of the system.

In an embodiment of the invention, the filter unit base described in the above comprises two mounting faces which enables a plurality of filter cassettes to be mounted on both mounting faces. This reduces the number of bases necessary to install a given amount of filter screen area and also reduces the number of outlets to the catalytic reaction chamber necessary for a given amount of filter screen area, hence it simplifies the equipment and lowers the production and installation price. In a specific embodiment, the two mounting faces are arranged on two opposing sides of the base. A further possible embodiment is to have three, four or more mounting faces on the base.

In a further embodiment of the invention, the integrated outlet of the filter unit is arranged in the bottom of the base, which is practical in many cases where the filter units are arranged above the catalytic reaction chamber of the reactor and thus, the outlet can lead directly from the filter unit downstream towards the reaction chamber.

The filter cassette may comprise two filter screens in a further embodiment. The filter screens may be arranged serially with respect to the process fluid flow, which then has to pass both screens. This may be beneficial especially when the screens are installed in the reactor in a position different from horizontal, such as vertically. As the particles due to gravity tend to be collected on the lower part of the screens first, two serially connected screens enables a spill-over effect from the upstream screen which during operation is partially clogged in the lower part, and further to the downstream screen which is less clogged. In this fashion, the total filter screen area is increased without increasing the outer area of the filter unit accordingly.

This principle can be taken even a step further by having several cassettes mounted upon each other in a serial connection with respect to the fluid flow. Accordingly, in a further embodiment of the invention, one or more $1^{st}$ order cassettes are mounted on the base and then one or more $2^{nd}$ order cassettes are mounted onto the $1^{st}$ order cassettes. The filter screen area of a single filter unit can thus be several times larger than the outer area of the filter unit, i.e. if each cassette comprises two process fluid serial arranged filter screens, two cassettes are mounted on top of each other and the base has two mounting faces, the total filter screen area of the filter unit can be approximately four times larger than the area of cassette itself and significantly larger than the total area of the filter unit in total. As the filter screen area is essential for the filter unit's ability to collect particles and the production time possible before a service stop is necessary, the filter screen area can be increased even further by providing a zig-zag pattern to the filter screen when seen in a cross-directional view. Accordingly, the filter screen can in one embodiment be made of perforated metal plate which is bended in a zig-zag pattern. The aperture size as well as the open area of the filter screen defined by the total area of the apertures of the screen may vary according to the needs of the specific process. In one embodiment, the open area is at least 40% of the screen area.

In an embodiment of the invention, the easy handling of the filter unit is enhanced by hand operated quick release fixtures for attaching the cassette to the base. The quick release means facilitates easy mounting and removal of the cassettes on or from the filter unit base. Also this solution is a safety measure, as less operation time for any personnel is needed within the reactor.

To further facilitate easy service of the filter unit, the filter cassettes may in a further embodiment be made of two detachable sections. Each cassette section comprises at least one filter screen and the sections may be fixed together by means of hand operated quick releases. As explained earlier, it is important that the filter unit is easily serviced, for economic as well as safety reasons. By splitting the cassette in two sections, it is possible to reach and clean the area between the two sections and further, each part which needs handling has a low weight. In a further embodiment, the void within the cassette between the two screen may be filled with catalytic or inert material which is permeable for the process fluid stream to the reactor. Thus, without blocking the filter unit, the filtering properties and even the catalytic properties of the filter unit may be enhanced.

The mentioned quick release means may in one embodiment comprise engaging connections on either section of the cassette as well as between the cassette and the base. These connections may be released simply by tilting one part away from the other, i.e. by tilting one cassette section away from the other. This principle allows for dismantling of the filter unit parts in very narrow space and when the parts are still resting on a support in the reactor, no lifting is necessary. The tilting angle may be only a few degrees, e.g. around 5. In one embodiment the tilting angle is below 45. To secure a plurality of cassettes to a base, a locking bar may in one embodiment be employed, which in one single operation/movement secures a plurality of cassettes to the base. In a further embodiment, a lid is adapted to cover the top of the filter unit with all cassettes mounted on the base. The lid may be fixed to the filter unit by using hand operated quick release means. Also the lid may in one embodiment be adapted to fix the cassettes to the base of the filter unit. Any of the mentioned quick release means may be of the key- and key-hole, sliding pins or other known types.

In one embodiment, the reactor may have a dome shaped upper part, comprising the process fluid inlet in the upper part of the dome and a base plate in the lower part of the dome. The base of each of the one or more filter units of the invention are mounted on this base plate, which has an aperture beneath each of the filter unit bases to provide process fluid flow passage from the reactor process fluid inlet, through the one or more filter units out through the one or more filter unit outlets and further downwards towards the catalytic reaction chamber of the reactor. In an embodiment of the invention, the particle separating catalytic reactor is a hydroprocessing reactor.

FEATURES OF THE INVENTION

1. Particle separating catalytic reactor for chemical reactions, comprising at least one filter unit for separating particles from the inlet fluid stream to the reactor, said filter unit comprises a base, at least one filter cassette comprising one or more filter screens comprising apertures, wherein said base comprises at least one mounting face for mounting of one or more of the filter cassettes and the base further comprises a fluid outlet for the filter unit to a catalyst reaction chamber of the reactor, whereby the base is an integrated cassette base and filter unit outlet.

2. Particle separating catalytic reactor according to feature 1, wherein said base comprises two mounting faces for mounting a plurality of filter cassettes.

3. Particle separating catalytic reactor according to feature 2, wherein the two mounting faces are arranged on two opposing sides of the base.

4. Particle separating catalytic reactor according to any of the preceding features, wherein the fluid outlet is arranged in the bottom of said base.

5. Particle separating catalytic reactor according to any of the preceding features, wherein each filter cassette comprises two filter screens.

6. Particle separating catalytic reactor according to any of the preceding features, wherein the filter unit comprises at least one $1^{st}$ order cassette and at least one $2^{nd}$ order cassette, the $1^{st}$ order cassette adapted to be mounted on the mounting face and the $2^{nd}$ order cassette adapted to be mounted on the $1^{st}$ order cassette, whereby the $1^{st}$ and the $2^{nd}$ order cassettes are arranged in serial connection with regard to the fluid flow.

7. Particle separating catalytic reactor according to any of the preceding features, wherein the screens are made of bended metal plate with a zig-zag pattern when seen in a cross-directional view.

8. Particle separating catalytic reactor according to any of the preceding features, wherein the cassette is attached to the base with one or more hand operated quick release fixtures, whereby the cassette is easily mounted and removed on or from the base.

9. Particle separating catalytic reactor according to any of the preceding features, wherein the cassette is made by two sections, each section comprising a screen and said two sections are attached together with one or more hand operated quick release fixtures, whereby the cassette is easily assembled or disassembled.

10. Particle separating catalytic reactor according to feature 9, wherein the void between the two sections are filled with catalytic material or inert material, said material or the free space between particles of the material being permeable for the fluid stream to the reactor.

11. Particle separating catalytic reactor according to feature 9, wherein the two cassette sections can be assembled by tilting one section towards the other from an angle of less than 45° and fixed together by said quick release fixture, and disassembled by removing the quick release fixture and tilting the two sections away from each other to an angle of less than 45°.

12. Particle separating catalytic reactor according to any of the preceding features, wherein the filter unit further comprises one or more locking bar, each locking bar is adapted to lock a plurality of cassettes to the base.

13. Particle separating catalytic reactor according to any of the preceding features, wherein the filter unit comprises a lid adapted to cover the top end of the base and one or more cassettes when the base and cassettes are assembled.

14. Particle separating catalytic reactor according to any of the preceding features, wherein the filter unit is assembled by means of locking pins or key and key hole locks or locking pins as well as key and key hole locks.

15. Particle separating catalytic reactor according to any of the preceding features, wherein the screens are fixed to the filter cassette by means of one or more hand operated quick release fixtures, whereby the screens can be easily mounted and removed on or from the cassettes.

16. Particle separating catalytic reactor according to any of the preceding features, wherein the reactor has a dome shaped upper part, and a base plate is located beneath or within the lower part of the dome and above the catalyst reaction chamber, the one or more filter units are located within the dome, mounted on said base plate and said outlet is located above an aperture in the base plate, enabling fluid passage from the dome, through the filter unit and further down into the catalyst reaction chamber.

17. Particle separating catalytic reactor according to any of the preceding features, wherein said catalytic reactor is a hydroprocessing reactor.

BRIEF DESCRIPTION OF THE DRAWINGS

The invention is further illustrated by the accompanying drawings showing examples of embodiments of the invention.

POSITION NUMBERS

01. Filter unit.
02. Base.
03. $1^{st}$ order cassette.
04. $2^{nd}$ order cassette.
05. Screen.
06. Cassette Frame.
07. Lid.
08. Outlet.
09. Quick release.
10. Locking bar.
11. Locking pin.
12. Key.
13. Key hole.
14. Shackle.
15. Mounting face

DESCRIPTION OF THE DRAWINGS

Some specific embodiments of the invention will be explained in more detail in the following with reference to the drawings as seen in FIG. 1 to FIG. 14.

A catalytic reactor (not shown) comprises a hollow top compartment where process fluid enters. In this hollow space one or more filter units 01 as shown in assembled state in FIG. 1 may be installed, providing the feature of particle separation to the process without demanding extra space added to the reactor.

Figure 1:
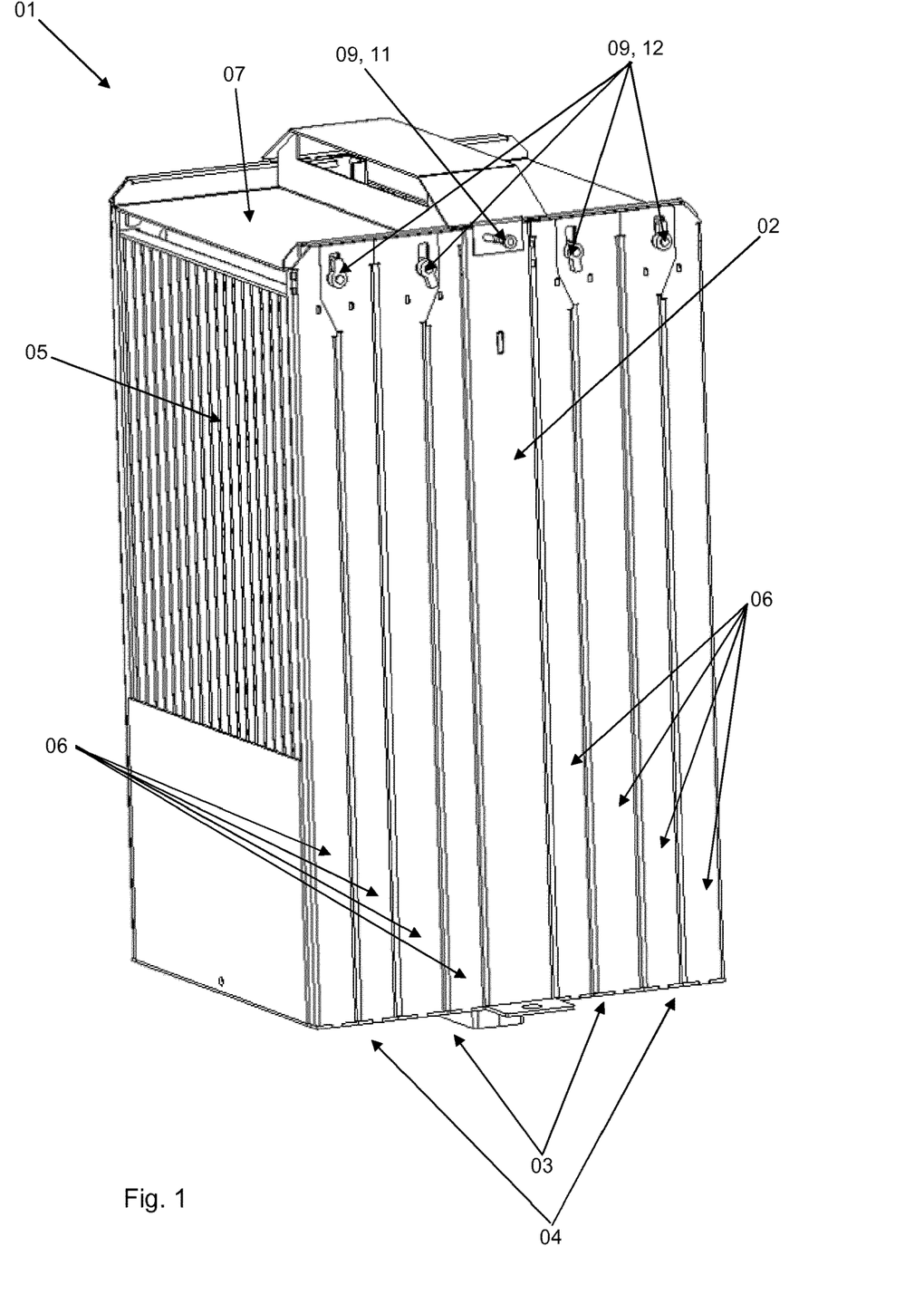
FIG. 1 shows an isometric view of the assembled filter unit.

The filter unit comprises a base 02 which is arranged in the middle of the filter unit and above an aperture in a base plate of the reactor (not shown) to provide fluid connection from the outlet of the base (shown in a further Figure) to the reaction chamber of the reactor below the filter unit. On each side of the base $1^{st}$ and $2^{nd}$ order cassettes 03, 04 are mounted. The cassettes are made of two frame 06 sections which are fixed together by quick release key locks 09, 12. All cassettes comprises filter screens 05 to collect particles from the process fluid flowing through the filter unit. The top of the filter unit, i.e. base and mounted filter cassettes are covered by a lid 07, preventing process fluid and especially particles to by-pass the screens. The lid is fixed to the filter unit also by means of quick releases 09, in the form of sliding locking pins 11.

Figure 2:
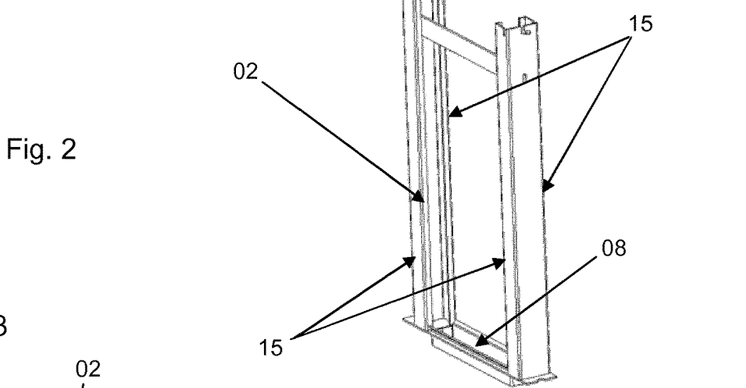
FIGS. 2-14 show isometric views of the filter unit parts in different stages of assembly.
Figure 3:
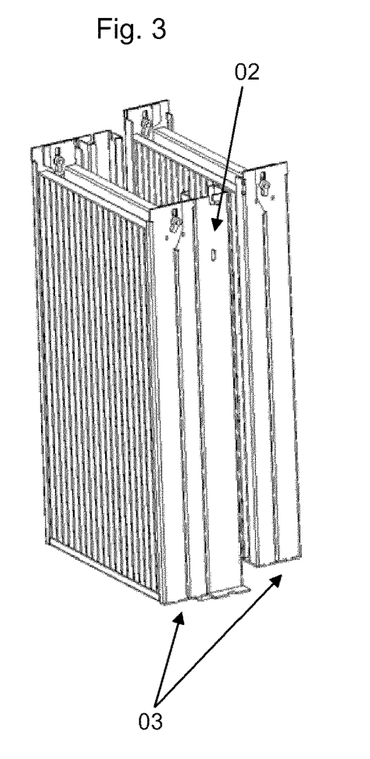
Figure 4:
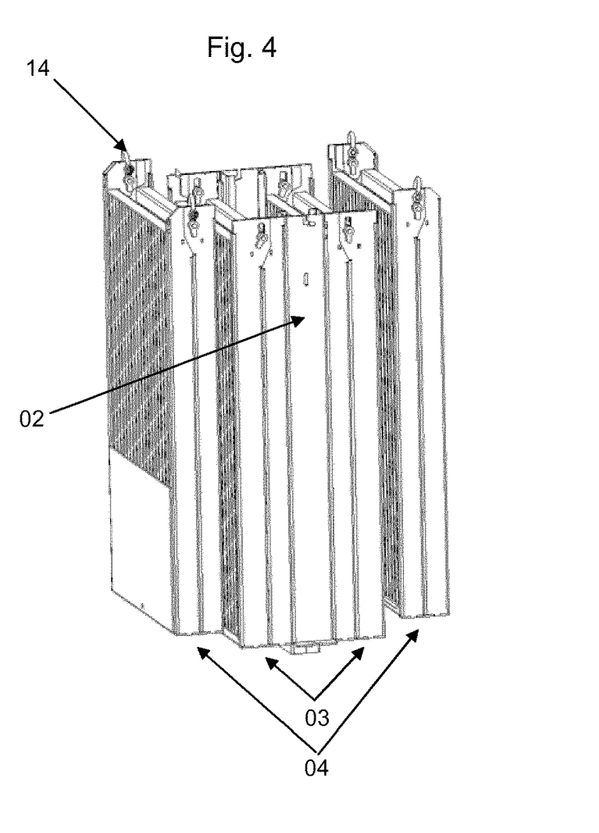
Figure 5:
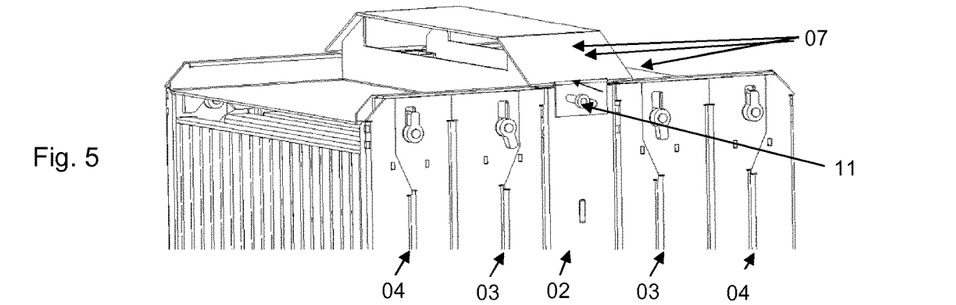
Figure 6:
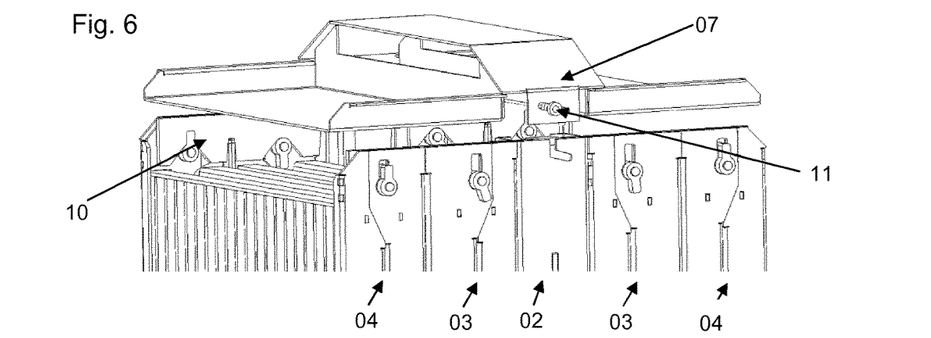
Figure 7:
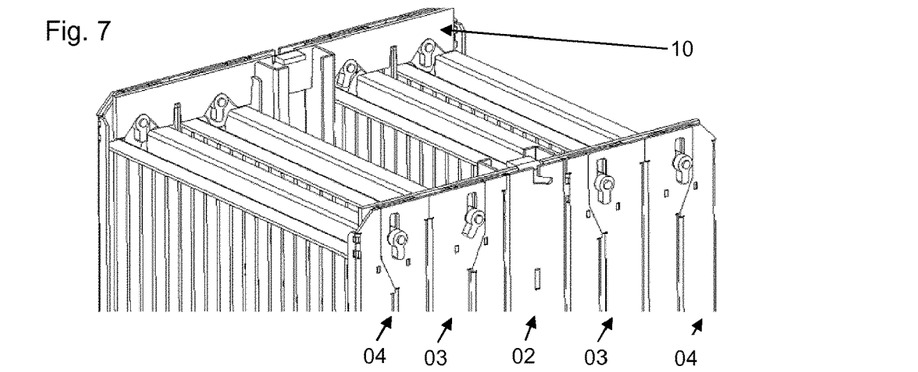
Figure 8:
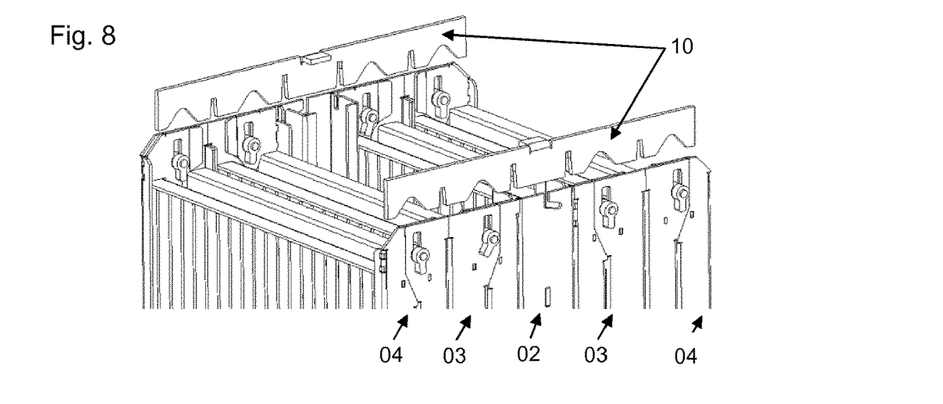

The filter unit base is seen in more detail in FIG. 2. It comprises a process fluid outlet 08 in the bottom and two mounting faces 15, one on each side of the base, to receive a $1^{st}$ order cassette on each side as seen in FIG. 3. The $1^{st}$ order cassettes are adapted to receive a $2^{nd}$ order cassette each as seen in FIG. 4. The cassettes can be handled by hand or with help of a crane or other lifting equipment by means of shackles 14. The cassettes are at the bottom fixed to the base and each other by means of interlocking fixing means (not shown) such as bended plate edges or the like. At the top, all the units, base, $1^{st}$ and $2^{nd}$ order cassettes are fixed together by two locking bars 10 which have cut-outs fitted to match the base and the cassettes and are slided downwards onto the assembled cassettes and base as seen in FIGS. 8 and 7. On top of the assembly, a lid 07 is provided to prevent the process fluid to by-pass the filter screens. The lid is fixed in position by means of the sliding locking pins as seen in FIGS. 6 and 5.

Figures 9, 10:
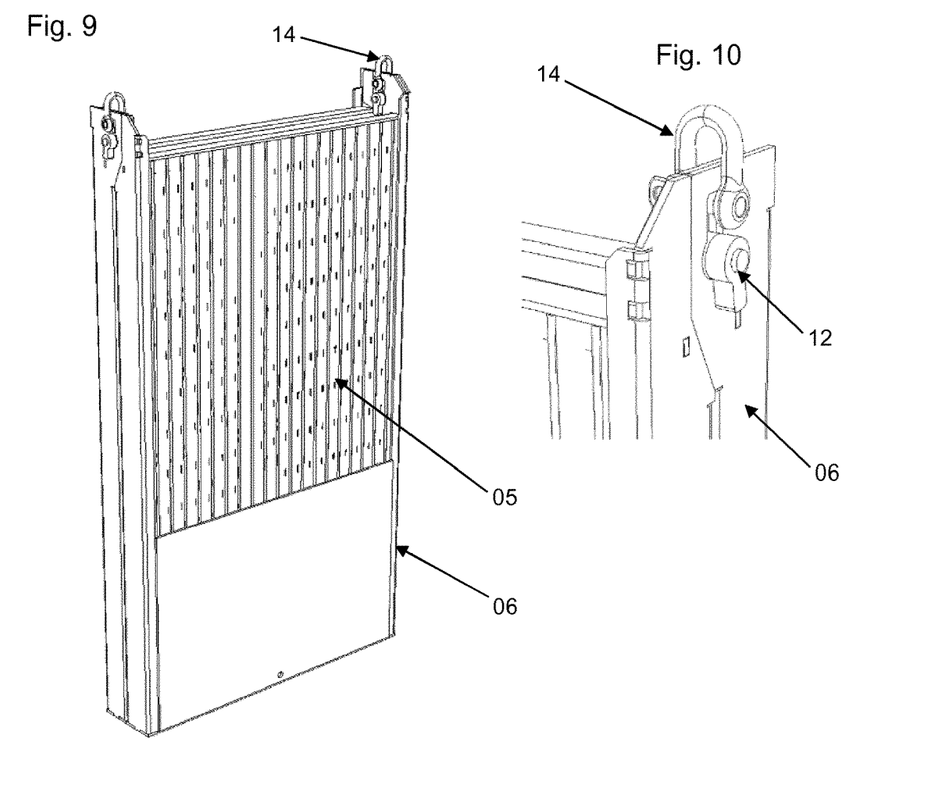
Figure 11:
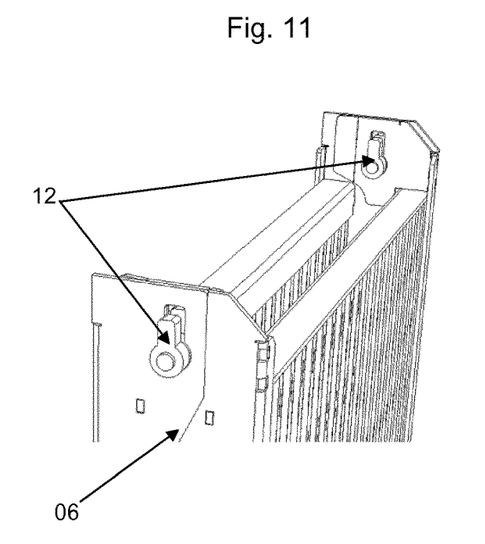
Figure 12:
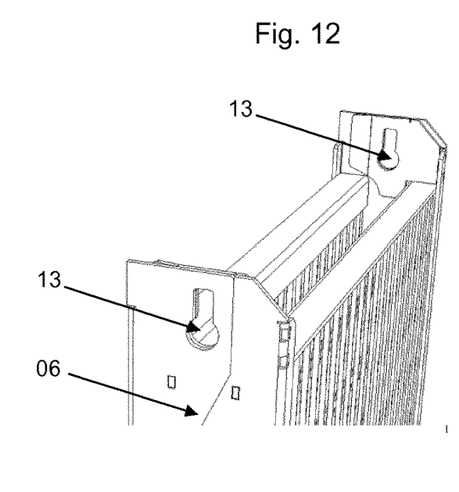

Each cassette comprises two sections which are fixed together by hand operated quick releases, key and key hole 13 locks which are in a locked position as seen in FIGS. 9 and 10, and released after being turned to the unlocked position as seen in FIGS. 11 and 12.

Figure 13:
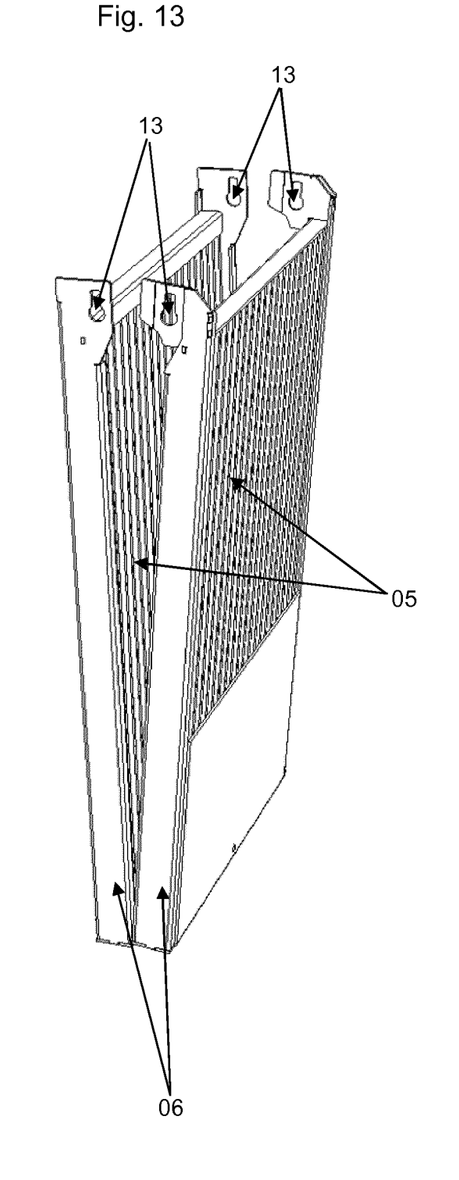
Figure 14:
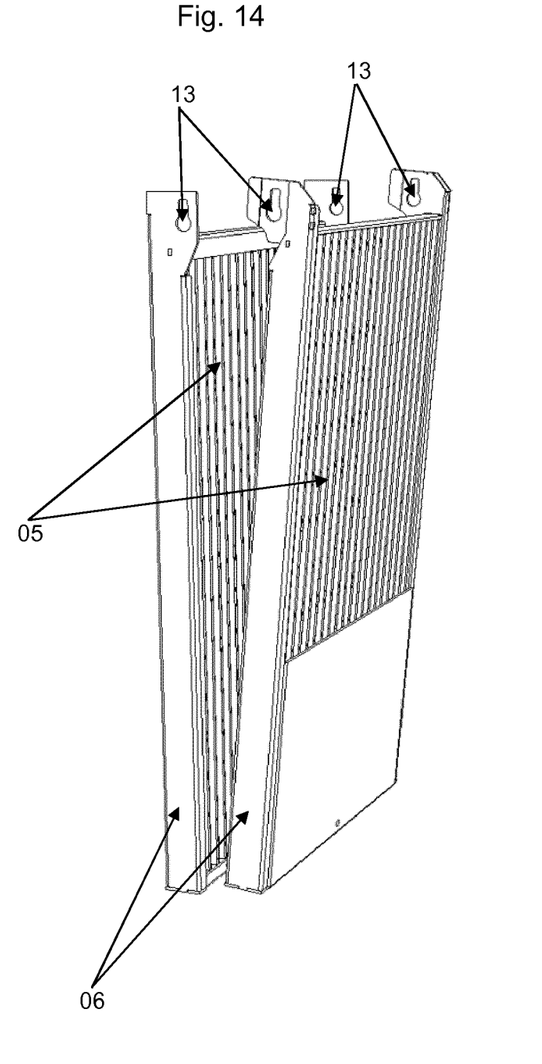

When the keys have been removed from the key holes, the two cassette sections can be removed from each other, enabling access to service and cleaning of the filter screens, by tilting the two cassette parts a few degrees away from each other as seen in FIGS. 13 and 14, which releases the interlocking fixture (not shown) in the bottom part of the cassette sections.

As explained, this easy assembling and dismantling of the filter unit in a plurality of parts provides easy and fast access to service and cleaning of the filter unit without the use of tools. Depending of the size of the filter unit, each of the parts may even be handled and lifted by hand.

The invention claimed is:

1. Particle separating catalytic reactor for chemical reactions, comprising at least one filter unit for separating particles from the inlet fluid stream to the reactor, said filter unit comprises a base, at least one filter cassette comprising one or more filter screens comprising apertures, wherein said base comprises at least one mounting face for mounting of one or more of the filter cassettes and the base further comprises a fluid outlet for the filter unit to a catalyst reaction chamber of the reactor, whereby the base is an integrated cassette base and filter unit outlet.

2. Particle separating catalytic reactor according to claim 1, wherein said base comprises two mounting faces for mounting a plurality of filter cassettes.

3. Particle separating catalytic reactor according to claim 2, wherein the two mounting faces are arranged on two opposing sides of the base.

4. Particle separating catalytic reactor according to claim 1, wherein the fluid outlet is arranged in the bottom of said base.

5. Particle separating catalytic reactor according to claim 1, wherein each filter cassette comprises two filter screens.

6. Particle separating catalytic reactor according to claim 1, wherein the filter unit comprises at least one $1^{st}$ order cassette and at least one $2^{nd}$ cassette, the $1^{st}$ order cassette adapted to be mounted on the mounting face and the $2^{nd}$ order cassette adapted to be mounted on the $1^{st}$ order cassette, whereby the $1^{st}$ and the $2^{nd}$ order cassettes are arranged in serial connection with regard to the fluid flow.

7. Particle separating catalytic reactor according to claim 1, wherein the screens are made of bent metal plate with a zig-zag pattern when seen in a cross-directional view.

8. Particle separating catalytic reactor according to claim 1, wherein the cassette is attached to the base with one or more hand operated quick release fixtures, whereby the cassette is easily mounted and removed on or from the base.

9. Particle separating catalytic reactor according to claim 1, wherein the cassette is made by two sections, each section comprising a screen, and said two sections are attached together with one or more hand operated quick release fixtures, whereby the cassette is easily assembled or disassembled.

10. Particle separating catalytic reactor according to claim 9, wherein a void between the two sections is filled with catalytic material or inert material, said material or the free space between particles of the material being permeable for the fluid stream to the reactor.

11. Particle separating catalytic reactor according to claim 9, wherein the two cassette sections can be assembled by tilting one section towards the other from an angle of less than 45° and fixed together by said quick release fixture, and disassembled by removing the quick release fixture and tilting the two sections away from each other to an angle of less than 45°.

12. Particle separating catalytic reactor according to claim 1, wherein the filter unit further comprises one or more locking bar, each locking bar is adapted to lock a plurality of cassettes to the base.

13. Particle separating catalytic reactor according to claim 1, wherein the filter unit comprises a lid adapted to cover the top end of the base and one or more cassettes when the base and cassettes are assembled.

14. Particle separating catalytic reactor according to claim 1, wherein the filter unit is assembled by means of locking pins or key and key hole locks or locking pins as well as key and key hole locks.

15. Particle separating catalytic reactor according to claim 1, wherein the screens are fixed to the filter cassette by means of one or more hand operated quick release fixtures, whereby the screens can be easily mounted and removed on or from the cassettes.

16. Particle separating catalytic reactor according to claim 1, wherein the reactor has a dome shaped upper part, and a base plate is located beneath or within the lower part of the dome and above the catalyst reaction chamber, the one or more filter units are located within the dome, mounted on said base plate and said outlet is located above an aperture in the base plate, enabling fluid passage from the dome, through the filter unit and further down into the catalyst reaction chamber.

17. Particle separating catalytic reactor according to claim 1, wherein said catalytic reactor is a hydroprocessing reactor.

* * * * *